United States Patent
Koivisto et al.

(10) Patent No.: US 9,380,526 B2
(45) Date of Patent: Jun. 28, 2016

(54) METHOD, APPARATUS AND COMPUTER PROGRAM PRODUCT FOR REDUCING OUTAGE PROBABILITY FOR MOBILE DEVICES

(75) Inventors: Tommi Koivisto, Espoo (FI); Huang Leping, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 363 days.

(21) Appl. No.: 12/739,931

(22) PCT Filed: Oct. 23, 2008

(86) PCT No.: PCT/IB2008/054387
§ 371 (c)(1),
(2), (4) Date: Apr. 26, 2010

(87) PCT Pub. No.: WO2009/053933
PCT Pub. Date: Apr. 30, 2009

(65) Prior Publication Data
US 2010/0248708 A1  Sep. 30, 2010

Related U.S. Application Data

(60) Provisional application No. 60/982,828, filed on Oct. 26, 2007.

(51) Int. Cl.
*H04W 40/00* (2009.01)
*H04W 48/20* (2009.01)
(Continued)

(52) U.S. Cl.
CPC .............. *H04W 48/20* (2013.01); *H04L 1/0003* (2013.01); *H04L 1/0009* (2013.01); *H04L 2001/0093* (2013.01); *H04W 4/02* (2013.01); *H04W 36/08* (2013.01)

(58) Field of Classification Search
CPC ....... H04L 1/00; H04L 1/0003; H04L 1/0006; H04L 1/0009; H04L 2001/0093; H04W 36/08; H04W 48/20; H04W 4/02

USPC .......... 455/414.3, 414.4, 422.1, 432.1, 432.2, 455/434, 435.1, 435.2, 436–442
See application file for complete search history.

(56) References Cited

U.S. PATENT DOCUMENTS

| 7,519,384 B2 | 4/2009 | Vaittinen et al. | |
| 2003/0045307 A1* | 3/2003 | Arviv et al. | 455/464 |

(Continued)

FOREIGN PATENT DOCUMENTS

EP  1467586 A  10/2004

OTHER PUBLICATIONS

3GPP TSG RAN WG2 Meeting #59, "Priority Scenarios for LTE MBMS Service Continuity", Orange, NTT DoCoMo, China Mobile, T-Mobile, Athens Greece, Aug. 20-24, 2007, 2 pages.

(Continued)

*Primary Examiner* — Thai Vu
(74) *Attorney, Agent, or Firm* — Mintz Levin Cohn Ferris Glovsky and Popeo, P.C.

(57) ABSTRACT

An apparatus for enabling dual mode communication may include a processor. The processor may be configured to receive (102), via a source cell, an indication of service availability for a particular service in a target cell, determine (104) whether a current transmission format of the target cell is indicative of the particular service being available at a region proximate to an edge of the target cell, switch to communication with the target cell from communication with the source cell in response to a determination that the current transmission format of the target cell indicates that the particular service is available' at the region proximate to the edge of the target cell, and trigger (110, 112, 130) the target cell to make an adjustment (120, 132) to the transmission format to cover cell edge area in response to a determination that the current transmission format of the target cell indicates that the particular service is not available at the region proximate to the edge of the target cell. A corresponding method and computer program product are also provided.

15 Claims, 7 Drawing Sheets

(51) Int. Cl.
*H04L 1/00* (2006.01)
*H04W 4/02* (2009.01)
*H04W 36/08* (2009.01)

(56) References Cited

U.S. PATENT DOCUMENTS

| | | | |
|---|---|---|---|
| 2004/0005882 A1* | 1/2004 | Yoshii | 455/422.1 |
| 2005/0101325 A1* | 5/2005 | Semper | 455/436 |
| 2006/0030330 A1 | 2/2006 | Black | |
| 2006/0116126 A1* | 6/2006 | Hidaka | 455/436 |
| 2006/0126570 A1* | 6/2006 | Kim et al. | 370/335 |
| 2006/0270407 A1* | 11/2006 | Hidaka | 455/436 |
| 2008/0084844 A1* | 4/2008 | Reznik et al. | 370/330 |

OTHER PUBLICATIONS

International Search Report and Written Opinion of the International Searching Authority mailed Mar. 25, 2009, for corresponding PCT Application No. PCT/IB2008/054387 filed Oct. 23, 2008, 16 pages.

* cited by examiner

# METHOD, APPARATUS AND COMPUTER PROGRAM PRODUCT FOR REDUCING OUTAGE PROBABILITY FOR MOBILE DEVICES

RELATED APPLICATION

This application was originally filed as PCT Application No. PCT/IB2008/054387 filed Oct. 23, 2008; which claims priority to U.S. Application No. 60/982,828 filed Oct. 26, 2007.

FIELD OF THE INVENTION

Embodiments of the present invention relate generally to communication technology and, more particularly, relate to an apparatus, method and a computer program product for reducing outage probability for a mobile device such as a mobile terminal receiving data from a multimedia broadcast multicast service (MBMS).

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. By providing access to users while enabling user mobility, services may be provided to users while the users remain mobile. Multimedia broadcast multicast service (MBMS) is an example of a service that has been developed to provide interactive and/or streaming content to users in a mobile environment.

LTE MBMS may be supported both on a carrier dedicated to MBMS usage and on a shared carrier in which MBMS is multiplexed with unicast downlink traffic. In addition, there may be different transmission techniques for LTE MBMS including single-cell point-to-multipoint (PtM) mode and MBMS single frequency network (MBSFN). In single-cell PtM mode, it may be possible to deliver MBMS data via common downlink resources and enable link adaptation using dedicated uplink feedback signaling. Link adaptation typically involves matching of the modulation, coding and other signal and protocol parameters to conditions on the radio link. Accordingly, link adaptation may be useful in maintaining continuity of service for a mobile terminal that is moving between different serving cells.

Recently, several scenarios have been identified as priority scenarios for optimizing service continuity in LTE MBMS. In this regard, exemplary scenarios include maintaining service continuity between intra-frequency shared carrier MBSFN and shared carrier single-cell PtM in both directions, between inter-frequency dedicated MBSFN and shared carrier single-cell PtM in both directions, and between intra-frequency shared carrier single-cell PtM and shared carrier single-cell PtM. However, for example, when link adaptation is used in single-cell PtM, the transmission mode may be optimized for mobile terminals that are currently receiving a particular service. Accordingly, if the mobile terminals currently receiving the particular service are located in an area with relatively good radio conditions (e.g., near the transmitting base station), it may be likely that a particular transmission format (e.g., a higher modulation and coding scheme (MCS)) may be in use in order to improve radio efficiency. Thus, if a new mobile terminal enters an edge of the service area provided by the transmitting base station, the particular transmission format may not be conducive to maintaining continuity of service for the new mobile terminal. For example, the MCS may be too high for the new mobile terminal (which may experience poorer radio conditions due to being at the edge of the service area) to decode the service correctly. Accordingly, the new mobile terminal may experience an outage that may result in a service break, which could continue until the new mobile terminal receives an uplink feedback channel to send channel quality information (CQI) reports and hybrid automatic repeat-request (HARM) ACK/NAK messages. The problem described above may be especially noticeable in a situation in which a mobile terminal in an idle state moves from one cell to another.

In light of the issues discussed above, it may be desirable to provide a mechanism for improving service continuity, even for mobile terminals in the idle state. Accordingly, it may be desirable to develop a mechanism by which at least some of the problems described above may be addressed.

BRIEF SUMMARY OF THE INVENTION

A method, apparatus and computer program product are therefore provided that may reduce the probability of outages for mobile terminals or other devices. For example, embodiments of the present invention may provide a mechanism by which service continuity (e.g., MBMS) may be improved. In this regard, for example, a mobile terminal that is about to switch from an original cell to a target cell may trigger an adjustment to the transmission format of the target cell. The adjustment to the transmission format of the target cell may reduce the probability of an outage for the mobile terminal.

In one exemplary embodiment, a method of reducing outage probability is provided. The method may include receiving, via a source cell, an indication of service availability for a particular service in a target cell, determining whether a current transmission format of the target cell is indicative of the particular service being available at a region proximate to an edge of the target cell, switching to communication with the target cell from communication with the source cell in response to a determination that the current transmission format of the target cell indicates that the particular service is available at the region proximate to the edge of the target cell, and triggering the target cell to make an adjustment to the current transmission format in response to a determination that the current transmission format of the target cell indicates that the particular service is not available at the region proximate to the edge of the target cell.

In another exemplary embodiment, a computer program product for reducing outage probability is provided. The computer program product includes at least one computer-readable storage medium having computer-executable program code instructions stored therein. The computer-executable program code instructions may include first, second, third and fourth program code instructions. The first program code instruction may be for receiving, via a source cell, an indication of service availability for a particular service in a target cell. The second program code instruction may be for determining whether a current transmission format of the target cell is indicative of the particular service being available at a region proximate to an edge of the target cell. The third program code instruction may be for switching to communication with the target cell from communication with the source cell in response to a determination that the current transmission format of the target cell indicates that the particular service is available at the region proximate to the edge of the target cell. The fourth program code instruction may be for triggering the target cell to make an adjustment to the current transmission format in response to a determination that the current transmission format of the target cell indicates that the particular service is not available at the region proximate to the edge of the target cell.

In another exemplary embodiment, an apparatus for reducing outage probability is provided. The apparatus may include a processor. The processor may be configured to receive, via a source cell, an indication of service availability for a particular service in a target cell, determine whether a current transmission format of the target cell is indicative of the particular service being available at a region proximate to an edge of the target cell, switch to communication with the target cell from communication with the source cell in response to a determination that the current transmission format of the target cell indicates that the particular service is available at the region proximate to the edge of the target cell, and trigger the target cell to make an adjustment to the current transmission format in response to a determination that the current transmission format of the target cell indicates that the particular service is not available at the region proximate to the edge of the target cell.

In another exemplary embodiment, an apparatus for reducing outage probability is provided. The apparatus includes means for receiving, via a source cell, an indication of service availability for a particular service in a target cell, means for determining whether a current transmission format of the target cell is indicative of the particular service being available at a region proximate to an edge of the target cell, means for switching to communication with the target cell from communication with the source cell in response to a determination that the current transmission format of the target cell indicates that the particular service is available at the region proximate to the edge of the target cell, and means for triggering the target cell to make an adjustment to the current transmission format in response to a determination that the current transmission format of the target cell indicates that the particular service is not available at the region proximate to the edge of the target cell.

Moreover, embodiments of the present invention may reduce a burden of increased signaling that a core network may face due to keeping terminals in or transitioning terminals to a connected state. In this regard, embodiments of the present invention may provide an availability indicator with respect to a service, which may enable a mobile terminal to perform a handover while maintaining an idle state if, with respect to service reception, it is not required for the mobile terminal to enter the connected state. Accordingly, embodiments of the present invention may provide for improved flexibility in dealing with network load issues.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
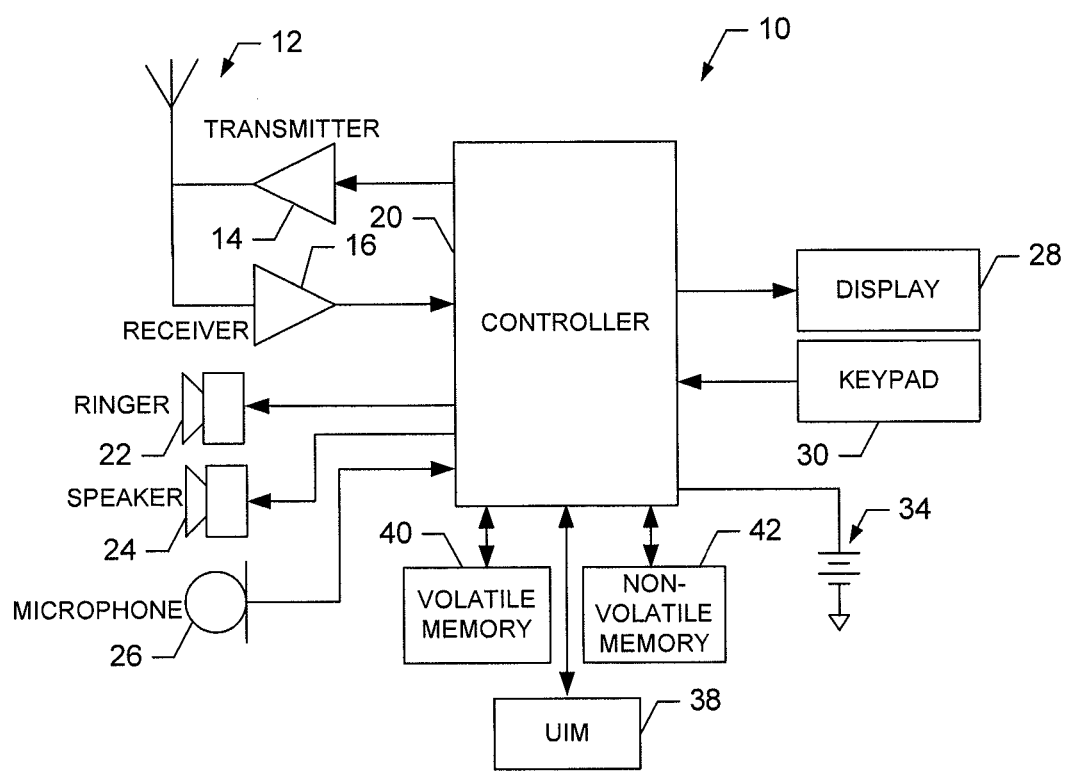
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from embodiments of the present invention. It should be understood, however, that a mobile telephone as illustrated and hereinafter described is merely illustrative of one type of mobile terminal that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 may include an antenna 12 (or multiple antennae) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and also user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), global system for mobile communications (GSM), and IS-95 (code division multiple access (CDMA)), or with third-generation (3G) wireless communication protocols, such as universal mobile telecommunications system (UMTS), CDMA2000, wideband CDMA (WCDMA) and time division synchronous CDMA (TD-SCDMA), long term evolution (LTE) or evolved universal terrestrial radio access network (E-UTRAN), with fourth-generation (4G) wireless communication protocols or the like.

It is understood that apparatus such as the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electronically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
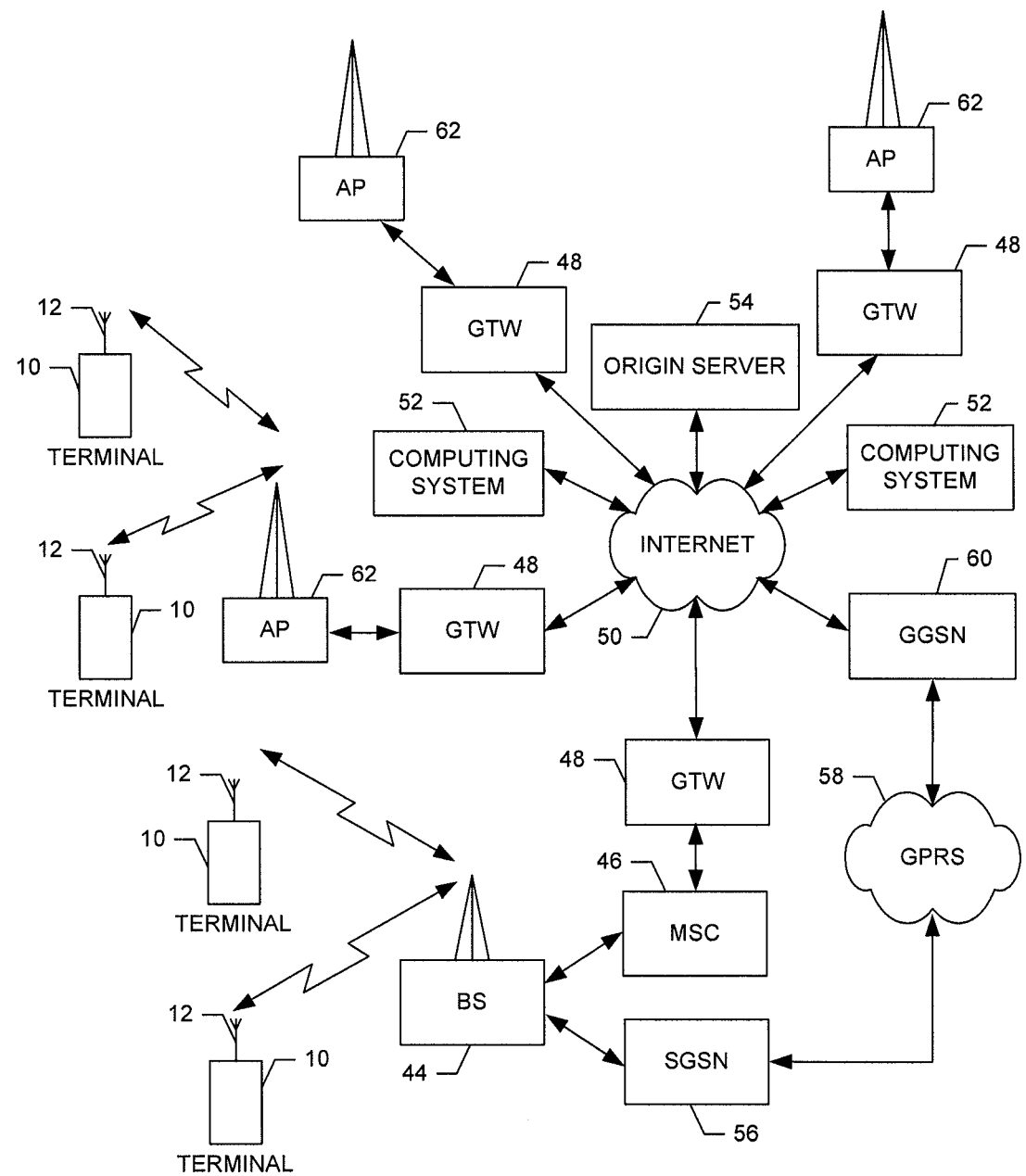
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that may benefit from embodiments of the present invention is provided. The system may include a plurality of network devices. As shown, one or more mobile terminals 10 may each include an antenna 12 for transmitting signals to and for receiving signals from a base site or base station (BS) 44. The base station 44 (which in E-UTRAN is referred to as a node-B) may be a part of one or more cellular or mobile networks each of which includes elements required to operate the network, such as a mobile switching center (MSC) 46. The mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one embodiment, however, the MSC 46 may be coupled to a gateway device (GTW) 48, and the GTW 48 may be coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. The SGSN 56 may be capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 may be coupled to a packet-switched core network, such as a GPRS core network 58. The packet-switched core network may then be coupled to another GTW 48, such as a gateway GPRS support node (GGSN) 60, and the GGSN 60 may be coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as E-UTRAN or a Universal Mobile Telephone System (UMTS) network employing Wideband Code Division Multiple Access (WCDMA) radio access technology. Some narrow-band AMPS (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, Worldwide Interoperability for Microwave Access (WiMAX), UWB techniques and/or the like.

In an exemplary embodiment, content or data may be communicated over the system of FIG. 2 between a mobile terminal, which may be similar to the mobile terminal 10 of FIG. 1 and a network device of the system of FIG. 2 in order to execute applications for establishing communication between the mobile terminal 10 and other mobile terminals, for example, via the system of FIG. 2. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a network device or other device accessible to the communication device.

Figure 3:
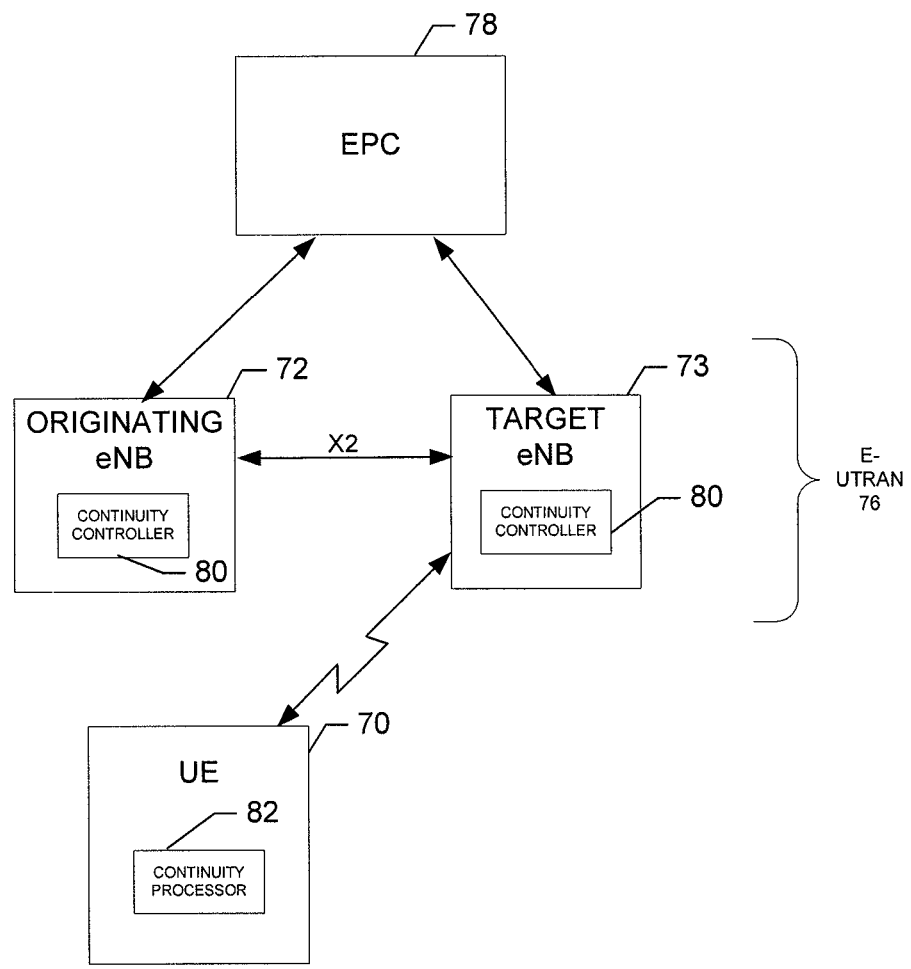
FIG. 3 is a schematic diagram showing a system for providing a mechanism for reducing the probability of an outage for a mobile device according to an exemplary embodiment of the present invention.

An exemplary embodiment of the invention will now be described with reference to FIG. 3, in which certain elements of a system for providing a mechanism for reducing the probability of an outage for a mobile device are displayed. The system of FIG. 3 represents a specific embodiment of a network such as the general network displayed in FIG. 2, except that FIG. 3 represents a general block diagram of an E-UTRAN. As such, in connection with FIG. 3, user equipment (UE) 70 may be exemplary of one embodiment of the mobile terminal 10 of FIG. 1 and eNBs (E-UTRAN node Bs) 72 may be similar in function to exemplary of embodiments of either the BS 44 or AP 62 of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1 or the network devices of FIG. 2. Moreover FIG. 3, which illustrates E-UTRAN components should be understood to be, in some cases, used in connection with some legacy devices and components (e.g., such as UTRAN or the components of FIG. 2). As such, one or more of the APs of FIG. 2, could represent eNBs if properly configured and equipped and placed in communication with a terminal such as the UE 70 of an embodiment of the present invention.

Referring now to FIG. 3, a schematic block diagram showing a system for providing a mechanism for reducing the probability of an outage for a mobile device according to an exemplary embodiment of the present invention is provided. The system includes an E-UTRAN 76 which may include, among other things, a plurality of node-Bs in communication with an evolved packet core (EPC) 78 which may include one or more mobility management entities (MMEs) and one or more system architecture evolution (SAE) gateways. The node-Bs may be E-UTRAN node-Bs (e.g., eNBs such as originating eNB 72 and target eNB 73) and may also be in communication with the UE 70 and other UEs. The E-UTRAN 76 may be in communication with the EPC 78.

The eNBs 72 and 73 may provide E-UTRA user plane and control plane (radio resource control (RRC)) protocol terminations for the UE 70. The eNBs 72 and 73 may provide functionality hosting for such functions as radio resource management, radio bearer control, radio admission control, connection mobility control, dynamic allocation of resources to UEs in both uplink and downlink, selection of an MME at UE attachment, IP header compression and encryption, scheduling of paging and broadcast information, routing of data, measurement and measurement reporting for configuration mobility, and the like.

The MME may host functions such as distribution of messages to respective node-Bs, security control, idle state mobility control, EPS (Evolved Packet System) bearer control, ciphering and integrity protection of (non access stratum) NAS signaling, and the like. The SAE gateway may host functions such as termination and switching of certain packets for paging and support of UE mobility. In an exemplary embodiment, the EPC 78 may provide connection to a network such as the Internet.

As shown in FIG. 3, the eNBs 72 and 73 may each include a continuity controller 80 configured to execute functions associated with each corresponding eNB with respect to receiving information from and/or providing information to the UE 70 and/or other eNBs related to, for example, communication format parameters (e.g., transmission format) of the corresponding eNB and/or neighboring eNBs. As such, the continuity controller 80 may be any means or device embodied in hardware, software or a combination of hardware and software that is configured to perform the functions of the continuity controller 80 as described herein. In an exemplary embodiment, the continuity controller 80 of each of the eNBs 72 and 73 may operate under the control of or otherwise be embodied as a processing element.

The UE 70 may include a continuity processor 82 which may be configured to execute functions with respect to receiving information from and/or providing information to the eNBs 72 and/or 73 related to, for example, communication format parameters of the corresponding eNB and/or neighboring eNBs. As such, the continuity processor 82 may be any means or device embodied in hardware, software or a combination of hardware and software that is configured to perform the functions of the continuity processor 82 as described herein. In an exemplary embodiment, the continuity processor 82 may operate under the control of or otherwise be embodied as a processing element (e.g., the controller 20). A processing element such as those described above may be embodied in many ways. For example, the continuity controller 80 and/or the continuity processor 82 may be embodied as a processor, a coprocessor, a controller or various other processing means or devices including integrated circuits such as, for example, an ASIC (application specific integrated circuit). It should be noted that although FIG. 3 illustrates a continuity controller as being disposed at each of the eNBs 72 and 73, the continuity controller 80 could alternatively be disposed at another element of the E-UTRAN 76 or the EPC 78 (e.g., the SAE gateway, the MME, a RAN, etc.) that is accessible to the eNBs 72 and 73.

In an exemplary embodiment, the continuity controller 80 of each of the eNBs 72 and 73 may be capable of communication with each other (e.g., via a eNB to eNB interface such as an X2 interface) and/or with the continuity processor 82 (either directly or indirectly). Accordingly, the UE 70 may communicate with the continuity controllers of either or both of the originating eNB 72 and the target eNB 73 in connection with a potential handover of the UE 70 from the originating eNB 72 to the target eNB 73, for example, when the UE 70 moves from a serving area (e.g., cell) associated with the originating eNB 72 to a serving area associated with the target eNB 73. Although communications may be described below as occurring between the eNBs 72 and 73 and the UE 70, it should be understood that communications related to service availability as described herein may be assumed to occur via the continuity controller 80 of the eNBs and the continuity processor 82, respectively.

It should be noted that the terms "originating" and "target" are merely used herein to refer to roles that any eNB may play at various different times in relation to being a source (e.g., originating) cell initially providing service to a UE or a destination (e.g., target) cell to which service is to be transferred do, for example, to the UE moving from the source cell to the destination cell. Thus, the terms "originating" and "target" could be applicable to the same eNB at various different times and such terms are not meant to be limiting in any way.

In general terms, embodiments of the present invention may provide that the UE 70 is informed via the originating eNB 72 (e.g., the cell in which the UE 70 is located initially or at least prior to a handover) of an availability of service (or of a particular service) in the target eNB 73. Dependent upon the availability of the service in the target eNB 73 (e.g., if the service would not be available under current conditions), the UE 70 may trigger the target eNB 73 to adjust the transmission format of the target eNB 73 to increase the likelihood that the service may be available to the UE 70 after a handover.

As an example, an availability indicator may be utilized to provide the information to the originating eNB 72 regarding the availability of the service in the target eNB 73. The availability indicator may be embodied as or otherwise include information indicative of a service availability status of the target eNB 73. In an exemplary embodiment, the continuity controller 80 of the originating eNB 72 may be configured to maintain information indicative of a service availability status for each neighboring cell (e.g., including the target eNB 73). As such, the continuity controller of each neighboring cell may be configured to communicate (e.g., via periodic, routine or continuous update) its own service availability status to each of its neighboring cells. Thus, the target eNB 73 may be configured to communicate its service availability status to the originating eNB 72 (e.g., via the X2 interface (an eNB to eNB interface)) and the originating eNB 72 (e.g., via the continuity controller 80) may maintain information indicative of the service availability status of the target eNB 73. The information indicative of the service availability status of the target eNB 73 may then be accessed by the UE 70 prior to conducting a handover to enable the UE 70 (e.g., via the continuity processor 82) to trigger, if necessary, a change to the transmission format of the target eNB 73.

The availability indicator could, in some embodiments, be representative of an indication as to whether the MCS of the target eNB 73 is low enough to enable the UE 70 to shift from service via the originating eNB 72 to service via the target eNB 73 without encountering a likelihood of experiencing an outage. Moreover, in some embodiments, the availability indicator may indicate whether the MCS of the target eNB 73 is low enough to enable the UE 70, while it is in an idle state, to change to service via the target eNB 73 without requiring the UE 70 to shift to a connected state. Accordingly, a predetermined or threshold MCS value may be set (e.g., based on trial and error, past experience, an accepted standard, operator settings, etc.) to assist in determining whether the MCS is too high (or has a likelihood of being too high) to enable continuity under the conditions described above.

As indicated above, if the UE 70 determines that the availability indicator of the target eNB 73 indicates that the service will not be available to the UE 70 without a likelihood of an outage, or without a need for the UE 70 to shift from an idle to connected state, the UE 70 (e.g., via the continuity processor 82) may trigger the target eNB 73 to alter its transmission format. In this regard, for example, the continuity processor 82 may communicate (directly or indirectly as described in alternative embodiments below) with the continuity controller 80 of the target eNB 73 to trigger the target eNB 73 to, for example, lower the MCS of the target eNB 73 to enable the UE 70 to shift to the target eNB 73 either without a loss of continuity or without requiring a change from the idle to connected state.

In an exemplary embodiment, the triggering of the target eNB 73 to adjust its transmission format may be performed via the originating eNB 72. In this regard, for example, the originating eNB 72 may provide information (e.g., via a normal handover measurement report) indicating that a handover is to be conducted from the originating eNB 72 to the target eNB 73. In one embodiment, the target eNB 73 may automatically adjust its transmission format (e.g., by reducing the MCS) when informed of the handover, if the transmission format is not already in a condition to support service continuity during the handover. An amount or character of the format adjustment (e.g., level to which the MCS is reduced) may be determined by a network operator or may be predetermined. Alternatively, the originating eNB 72 may include, for example, in the measurement report, information that may form the basis of a determination regarding the amount or character of the format adjustment.

In an alternative embodiment, the triggering of the target eNB 73 to adjust its transmission format may be performed via communication between the UE 70 and the target eNB 73 without assistance from the originating eNB 72. In this regard, for example, the target eNB 73 may make adjustments to the transmission format after cell change (e.g., via reselection after the handover from the originating eNB 72 to the target eNB 73). If the UE 70 is in an idle mode and a connected state procedure is typically used for informing the target eNB 73 of an intended handover, a delay and consequently lost data to the UE 70 could result. Accordingly, embodiments of the present invention may provide the UE 70 with an ability to communicate with the target eNB 73 (e.g., the continuity processor 82 may communicate with the continuity controller 80) to trigger the target eNB 73 to adjust the transmission format of the target eNB 73. In an exemplary embodiment, a certain MBMS specific random access preamble could be used for relatively fast indication from an idle mode UE to a target cell (e.g., the target eNB 73) in order to indicate to the target cell that the transmission format should be adjusted (e.g., that the target eNB 73 should lower the MCS).

Figure 4:
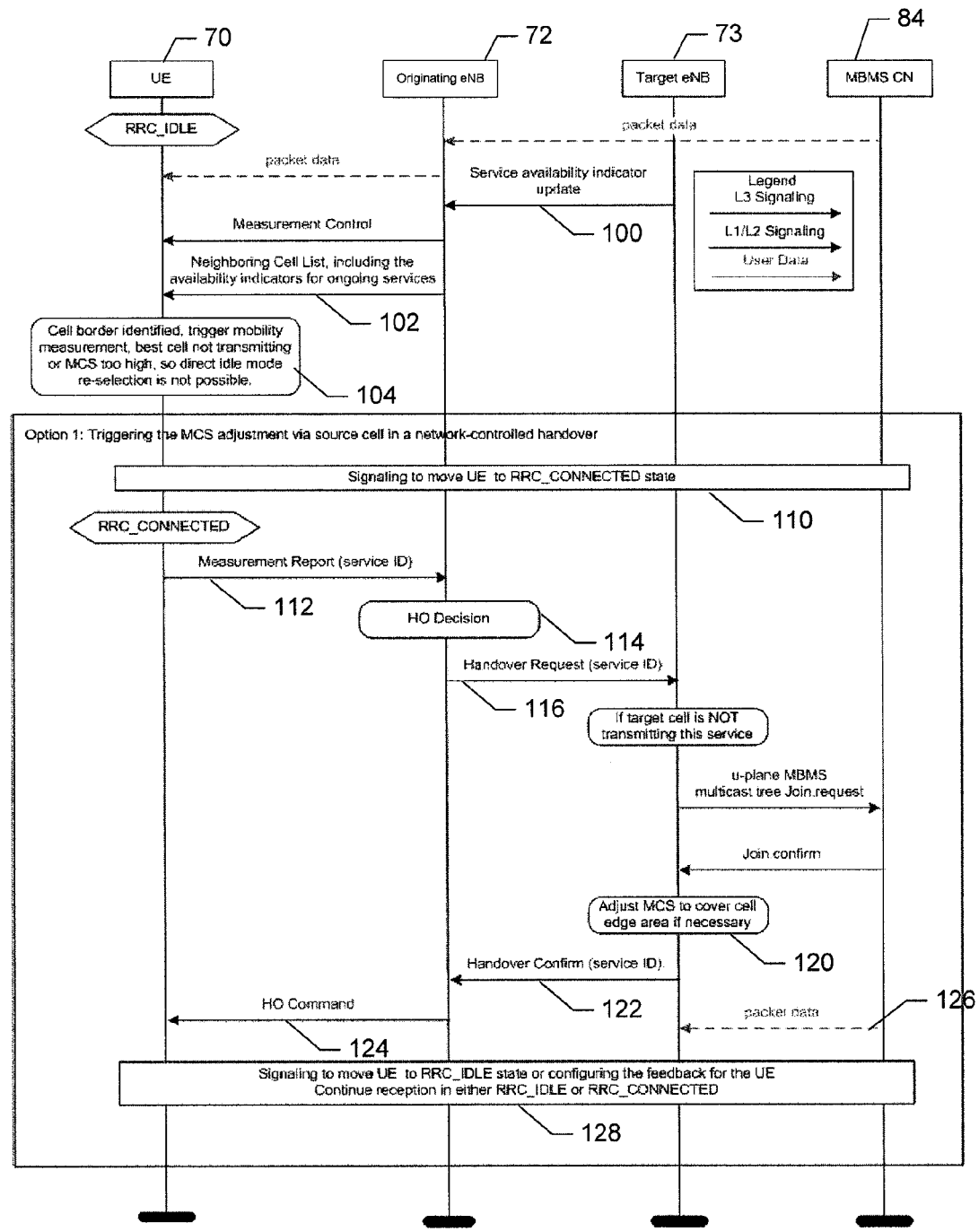
FIG. 4 is a control flow diagram illustrating a mechanism for enabling target cell transmission format adjustment via communication with the originating cell according to an exemplary embodiment of the present invention.
Figure 5:
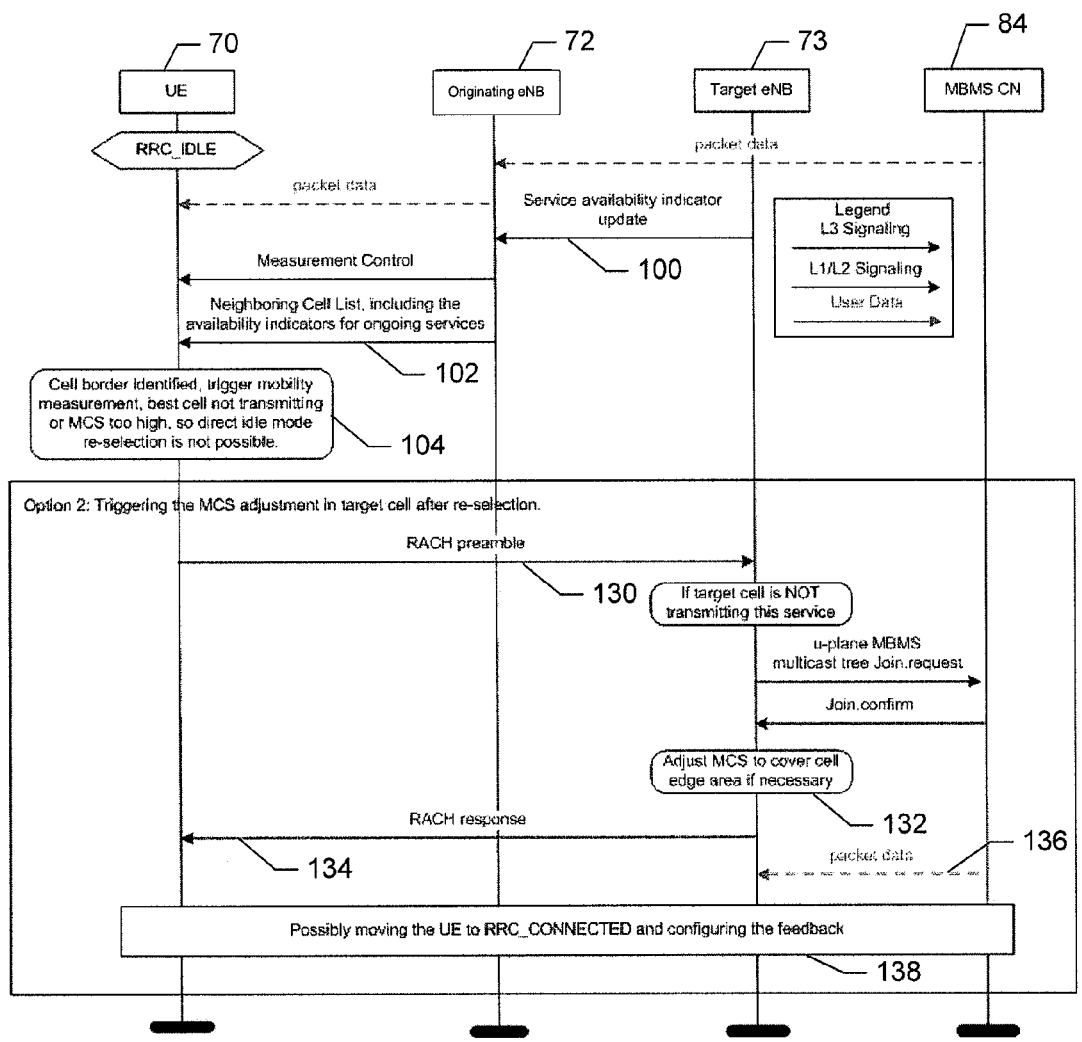
FIG. 5 is a control flow diagram illustrating a mechanism for enabling target cell transmission format adjustment via cell re-selection according to an exemplary embodiment of the present invention.

FIGS. 4 and 5 illustrate control flow diagrams showing exemplary message sequences according to embodiments of the present invention. In FIGS. 4 and 5, the MBMS CN 84 represents a core network capable of providing MBMS services. Additionally, it should be noted that communications between the eNBs 72 and 73 may be conducted, for example, via the continuity processor 82 and the continuity controller 80.

Initial communications in accordance with the embodiments of both of FIGS. 4 and 5 may be similar. In this regard, as can be seen from FIGS. 4 and 5, the UE 70 may initially be in an idle state. The originating eNB 72 may be receiving packet data associated with a particular service from the MBMS CN 84 and may be communicating the received packet data to the UE 70. At operation 100, the target eNB 73 may provide a service availability status update (e.g., an availability indicator) to the originating eNB 72 (and all other neighboring cells of the target eNB 73). Such an update may be provided, for example, whenever there are changes in the availability of a service in the target eNB's 73 edge area (e.g., if MCS is increased or increased above a particular threshold). In an exemplary embodiment, in order to reduce signaling between the target eNB 73 and the originating eNB 72, updates may be communicated based at least in part upon a feedback configuration of the eNBs 72 and 73. In this regard, for example, if the eNBs 72 and/or 73 are configured to have feedback on or enabled, the availability indicator may not be on (e.g., since feedback may be provided upon changes to transmission format). However, if the eNBs 72 and/or 73 are configured to have feedback off or disabled, the availability indicator may always be on (e.g., MCS may be set to a low or lowest value by default). Accordingly, eNB to eNB communication via the X2 interface may only be needed with respect to transmission format change determinations when the feedback configuration is changed in the target cell (e.g., the target eNB 73). Thus, more flexibility may be provided to operators with regard to provision of service continuity and balancing costs in terms of radio interface and/or X2 interface signaling.

Upon receipt of the availability indicator for a particular service at the originating eNB 72, the continuity controller 80 of the originating eNB 72 may update a neighboring cell list (NCL) for broadcast transmission (e.g., via the MBMS control channel (MCCH) of the originating eNB 72) to UEs in communication with the originating eNB 72 at operation 102. The NCL may be communicated along with other signaling information such as measurement control information. If the UE 70 identifies that it is near a cell border by any available mechanism, the UE 70 may trigger a mobility measurement (e.g., by determining whether the availability indicator for the particular service and the target eNB 73 indicate that a handover can be made while maintaining service continuity) at operation 104.

One embodiment will now be described in reference to FIG. 4, which is a control flow diagram illustrating a mechanism for enabling target cell transmission format adjustment via communication with the originating cell according to an exemplary embodiment of the present invention. As shown in FIG. 4, if triggering of the target eNB 73 transmission format adjustments is made via the originating eNB 72, signaling may initially be performed in order to move the UE 70 to the connected state at operation 110. The UE 70 may then communicate a measurement report (e.g., including a service ID) to the originating eNB 72 at operation 112. The originating eNB 72 may make a handover decision based on the measurement report at operation 114 and issue a handover request to the target eNB 73 at operation 116. If the target eNB 73 is not transmitting the particular service, the target eNB 73 may request to join the multicast tree for the service and receive a confirmation from the MBMS CN 84. The target eNB 73 may, if necessary, adjust its transmission format (e.g., by reducing MCS to cover communications to the edge area of the cell) at operation 120 and send a handover confirmation to the originating eNB 72 at operation 122. The originating eNB 72 may then communicate a handover command to the UE 70 at operation 124 and packet data intended for the UE 70 may begin to be sent from the MBMS CN 84 to the target eNB 73 at operation 126. Signaling may then be conducted to move the UE 70 to the idle state or configure feedback for the UE at operation 128.

An alternative embodiment will now be described in reference to FIG. 5, which is a control flow diagram illustrating a mechanism for enabling target cell transmission format adjustment via cell re-selection according to an exemplary embodiment of the present invention. In the alternative embodiment of FIG. 5, after the UE 70 is identified as being near the cell border between the originating eNB 72 and the target eNB 73, the UE 70 may communicate directly with the target eNB 73 to indicate to the target eNB 73 that the transmission format of the target eNB 73 should be adjusted (e.g., that the target eNB 73 should lower the MCS) at operation 130. In an exemplary embodiment, the UE 70 may communicate a random access channel (RACH) preamble to provide the indication at operation 130. If the target eNB 73 is not transmitting the particular service, the target eNB 73 may request to join the multicast tree for the service and receive a confirmation from the MBMS CN 84. The target eNB 73 may, if necessary, adjust its transmission format (e.g., by reducing MCS to cover communications to the edge area of the cell) at operation 132 and send a RACH response to the UE 70 at operation 134. The packet data intended for the UE 70 may then begin to be sent from the MBMS CN 84 to the target eNB 73 at operation 136. In some cases, either immediately or at a later time, the UE 70 may shift to the connected state in order to configure feedback as described above at operation 138.

Embodiments of the present invention may therefore provide that the latest service availability indicator is broadcast to the UE 70 via the originating eNB's 72 NCL (which can be transmitted, for example, via the MCCH). The UE 70 may then, when performing a cell change, read the availability indicator for the target eNB 73 from the NCL prior to handover. If the UE 70 determines that the desired service is not available at the edge of the target eNB's 73 service area (e.g., due to MCS being too high), the UE 70 can trigger the target eNB 73 to adjust the transmission format of the target eNB 73. Such triggering may be performed via the originating eNB 72 as shown in reference to FIG. 4, or the UE 70 may reselect to the target eNB 73 and then inform the target cell using a specified RACH preamble. The target eNB 73 may adjust its transmission format (e.g., alter its MCS) based on the received request from the originating eNB 72 or from the UE 70. If the UE 70 determines from the NCL that the service is already available in the target eNB 73 at the service edge, no signaling may be needed and the UE 70 may move to the target eNB 73 directly in idle mode.

Figure 6:
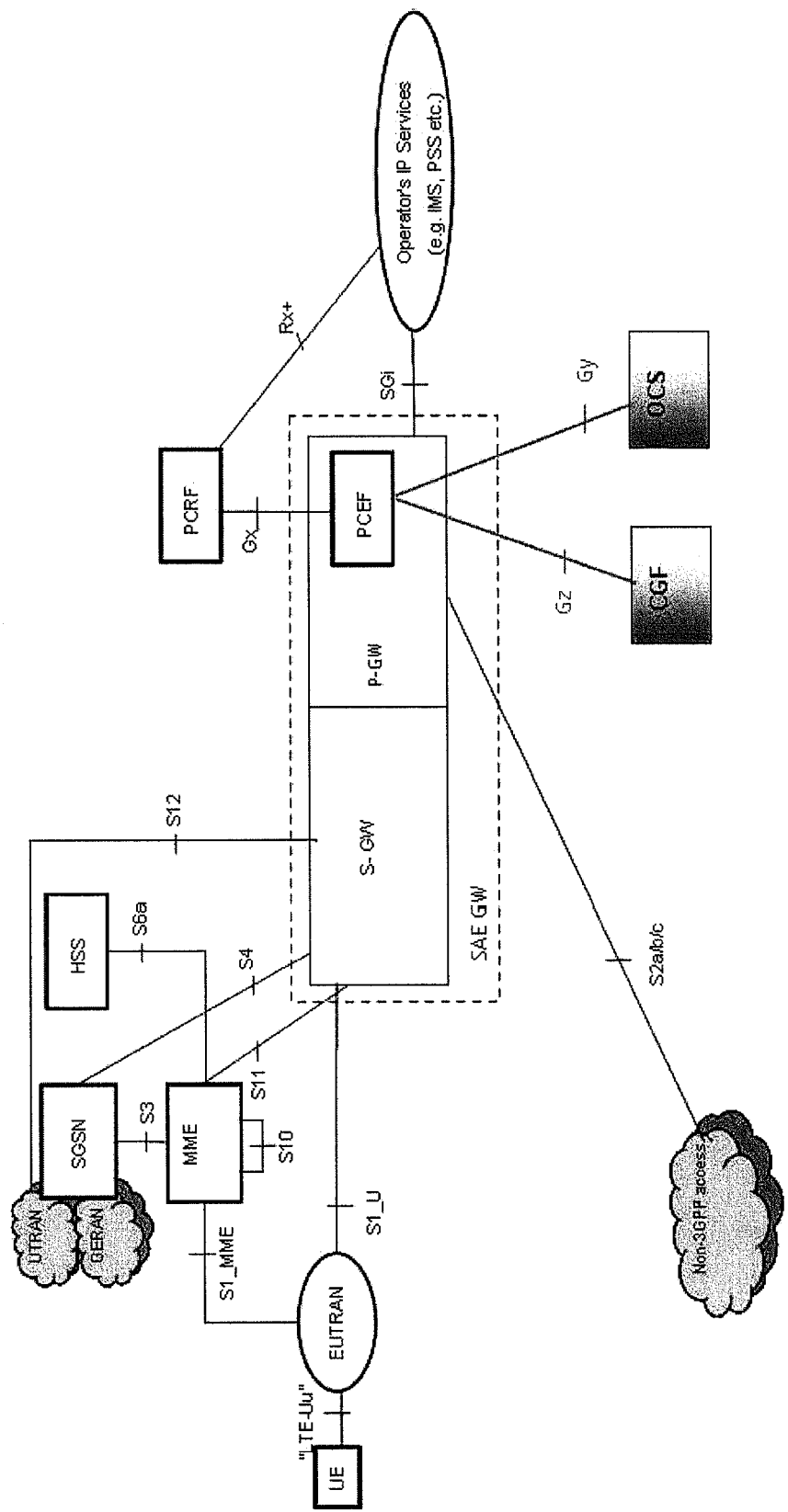
FIG. 6 is a schematic block diagram illustrating a SAE (System Architecture Evolution) architecture and radio access network according to an exemplary embodiment of the present invention.

FIG. 6 is a schematic block diagram illustrating a SAE (System Architecture Evolution) architecture and radio access network (RAN) in accordance with an exemplary embodiment of the present invention. In this regard, the core network is called SAE and the radio access network is LTE (Long Term Evolution). An LTE RAN is called E-UTRAN as opposed to UTRAN (WCDMA) and GSM EDGE radio access network (GERAN) (GSM). As shown in FIG. 6, the UE may be in communication with the MME and/or SAE gateway via the E-UTRAN and the UE may be served by various services via the E-UTRAN and the SAE gateway. Descriptions of various components of the FIGS. above may be found, for example, in 3GPP TS 36.300 V8.2.0 (2007-09).

Figure 7:
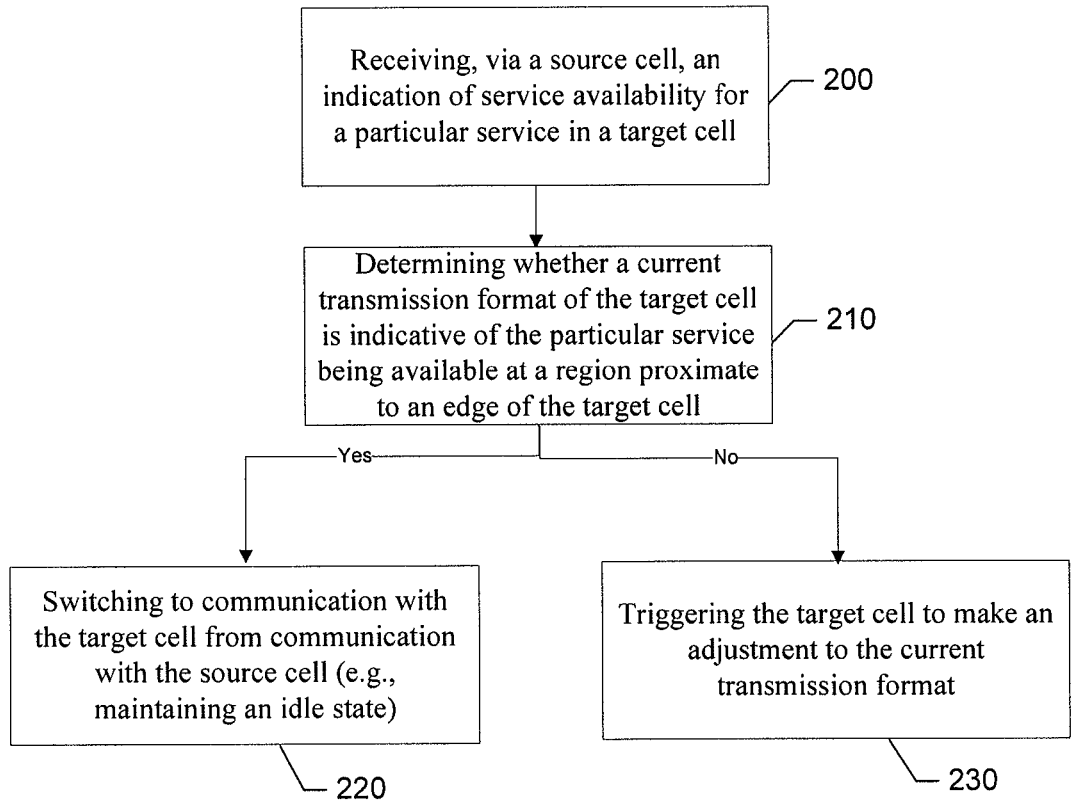
FIG. 7 is a flowchart according to an exemplary method for providing a mechanism for reducing the probability of an outage for a mobile device according to an exemplary embodiment of the present invention.

FIG. 7 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal or network device and executed by a built-in processor in the mobile terminal or network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing a reduction in the outage probability for a mobile or other device as illustrated in FIG. 7 may include receiving, via a source cell, an indication of service availability for a particular service in a target cell at operation 200. The method may further include determining whether a current transmission format of the target cell is indicative of the particular service being available at a region proximate to an edge of the target cell at operation 210. If it is determined that the current transmission format of the target cell indicates that the particular service is available at the region proximate to the edge of the target cell, communication may be switched to communication with the target cell from communication with the source cell, e.g., in an idle state, at operation 220. Meanwhile, if it is determined that the current transmission format of the target cell indicates that the particular service is not available at the region proximate to the edge of the target cell, the target cell may be triggered to make an adjustment to the current transmission format at operation 230. The adjustment could be a decrease in the MCS of the target cell. In one embodiment, operation 230 may include triggering the target cell to make the adjustment via communication with the source cell. However, in an alternative embodiment, operation 230 may include triggering the target cell to make the adjustment via a specific random access preamble or other communication made directly from a mobile terminal to the target cell, for example, while maintaining the mobile terminal in an idle mode.

Accordingly, embodiments of the present invention may reduce a burden of increased signaling that the core network may face due to keeping terminals in or transitioning terminals to a connected state (e.g., during a mobile terminal handover). In this regard, embodiments of the present invention may provide the availability indicator with respect to a particular service, which may enable a mobile terminal to perform a handover while maintaining an idle state if, with respect to reception of the particular service, it is not required for the mobile terminal to enter the connected state. Accordingly, embodiments of the present invention may provide for improved flexibility in dealing with network load issues.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    receiving, via a source cell, an indication of service availability for a particular service in a target cell, wherein the indication of service availability indicates at least a change in an availability of the particular service at a region proximate to an edge of the target cell;
    determining whether a current transmission format of the target cell is indicative of the particular service being available at the region proximate to the edge of the target cell;
    switching to communication with the target cell from communication with the source cell in response to a determination that the current transmission format of the target cell indicates that the particular service is available at the region proximate to the edge of the target cell; and
    triggering the target cell to make an adjustment to the current transmission format in response to a determination that the current transmission format of the target cell indicates that the particular service is not available at the region proximate to the edge of the target cell,
    wherein the adjustment to the current transmission format comprises adjusting at least a modulation and coding scheme.

2. The method of claim 1, wherein the triggering the target cell to make the adjustment comprises adjusting to a lower order modulation and coding scheme.

3. The method of claim 1, wherein the triggering the target cell to make the adjustment comprises triggering the target cell to make the adjustment via communication with the source cell.

4. The method of claim 1, wherein the triggering the target cell to make the adjustment comprises triggering the target cell to make the adjustment via a communication made directly from a mobile terminal to the target cell.

5. The method of claim 1, wherein the triggering the target cell to make the adjustment comprises triggering the target cell to make the adjustment via a communication made directly from a mobile terminal to the target cell while maintaining the mobile terminal in an idle mode.

6. The method of claim 1, wherein the triggering the target cell to make the adjustment comprises triggering the target cell to make the adjustment via a specific random access preamble from a mobile terminal to the target cell.

7. A non-transitory computer-readable storage medium encoded with instructions that, when executed by at least one processor, perform at least the following:
    receiving, via a source cell, an indication of service availability for a particular service in a target cell, wherein the indication of service availability indicates at least a change in an availability of the particular service at a region proximate to an edge of the target cell;
    determining whether a current transmission format of the target cell is indicative of the particular service being available at the region proximate to the edge of the target cell;
    switching to communication with the target cell from communication with the source cell in response to a determination that the current transmission format of the target cell indicates that the particular service is available at the region proximate to the edge of the target cell; and
    triggering the target cell to make an adjustment to the current transmission format in response to a determination that the current transmission format of the target cell indicates that the particular service is not available at the region proximate to the edge of the target cell,
    wherein the adjustment to the current transmission format comprises adjusting at least a modulation and coding scheme.

8. The non-transitory computer readable medium of claim 7, wherein the triggering the target cell to make the adjustment comprises adjusting to a lower order modulation and coding scheme.

9. An apparatus, comprising:
    at least one processor; and
    at least one memory including computer program code, the at least one memory and computer program code configured to, with the at least one processor, cause the apparatus to perform at least the following:

receive, via a source cell, an indication of service availability for a particular service in a target cell, wherein the indication of service availability indicates at least a change in an availability of the particular service at a region proximate to an edge of the target cell;

determine whether a current transmission format of the target cell is indicative of the particular service being available at the region proximate to the edge of the target cell;

switch to communication with the target cell from communication with the source cell in response to a determination that the current transmission format of the target cell indicates that the particular service is available at the region proximate to the edge of the target cell; and trigger the target cell to make an adjustment to the current transmission format in response to a determination that the current transmission format of the target cell indicates that the particular service is not available at the region proximate to the edge of the target cell, wherein the adjustment to the current transmission format comprises adjusting at least a modulation and coding scheme.

10. The apparatus of claim 9, wherein the processor is configured to trigger the target cell to make the adjustment by adjusting to a lower order modulation and coding scheme.

11. The apparatus of claim 9, wherein the processor is configured to trigger the target cell to make the adjustment by triggering the target cell to make the adjustment via communication with the source cell.

12. The apparatus of claim 9, wherein the processor is configured to trigger the target cell to make the adjustment by triggering the target cell to make the adjustment via a communication made directly from a mobile terminal to the target cell.

13. The apparatus of claim 9, wherein the processor is configured to trigger the target cell to make the adjustment by triggering the target cell to make the adjustment via a communication made directly from a mobile terminal to the target cell while maintaining the mobile terminal in an idle mode.

14. The apparatus of claim 9, wherein the processor is configured to trigger the target cell to make the adjustment by triggering the target cell to make the adjustment via a specific random access preamble from a mobile terminal to the target cell.

15. The method of claim 1, wherein the change comprises a modulation and coding change associated with the particular service at the region proximate to the edge of the target cell.

* * * * *